United States Patent
Kulkarni et al.

(10) Patent No.: US 10,174,162 B2
(45) Date of Patent: Jan. 8, 2019

(54) PROCESS FOR PREPARATION OF MODIFIED POLYETHYLENE TEREPHTHALATE WITH IMPROVED BARRIER, MECHANICAL AND THERMAL PROPERTIES AND PRODUCTS THEREOF

(71) Applicant: ESTER INDUSTRIES LIMITED, Udhamsingh Nagar, Uttarakhand (IN)

(72) Inventors: Sanjay Tammaji Kulkarni, Uttarakhand (IN); Balasundaram Dillyraj, Uttarakhand (IN); Chandrakant Omkar Vyas, Uttarakhand (IN)

(73) Assignee: Ester Industries Limited, Udhamsingh Nagar, Uttarakhand (IN)

(*) Notice: Subject to any disclaimer, the term of this patent is extended or adjusted under 35 U.S.C. 154(b) by 144 days.

(21) Appl. No.: 15/502,200

(22) PCT Filed: Aug. 5, 2015

(86) PCT No.: PCT/IN2015/050081
§ 371 (c)(1),
(2) Date: Feb. 6, 2017

(87) PCT Pub. No.: WO2016/020938
PCT Pub. Date: Feb. 11, 2016

(65) Prior Publication Data
US 2017/0233525 A1    Aug. 17, 2017

(30) Foreign Application Priority Data
Aug. 5, 2014 (IN) .......................... 2216/DEL/2014

(51) Int. Cl.
| | | |
|---|---|---|
| *C08G 63/91* | (2006.01) | |
| *C08G 63/183* | (2006.01) | |
| *C08L 67/02* | (2006.01) | |
| *C08G 63/189* | (2006.01) | |
| *C08K 3/34* | (2006.01) | |
| *C08K 3/36* | (2006.01) | |
| *C08K 5/098* | (2006.01) | |

(52) U.S. Cl.
CPC ......... *C08G 63/916* (2013.01); *C08G 63/183* (2013.01); *C08G 63/189* (2013.01); *C08K 3/34* (2013.01); *C08K 3/36* (2013.01); *C08K 5/098* (2013.01); *C08L 67/02* (2013.01); *C08G 2120/00* (2013.01); *C08G 2250/00* (2013.01)

(58) Field of Classification Search
CPC ........ C08L 67/00; C08L 67/02; C08L 67/025; C08L 67/03; C08L 2666/18; C08G 63/80; C08G 63/85; C08G 63/181; C08G 63/183; C08G 63/189; C08G 63/916; C08G 2250/00; C08G 2120/00; C08K 3/0033; C08K 3/013; C08K 3/34; C08K 3/36; C08K 5/0008; C08K 5/0083; C08K 5/098
See application file for complete search history.

(56) References Cited

U.S. PATENT DOCUMENTS

| | | | |
|---|---|---|---|
| 5,663,238 A | * | 9/1997 | Wang .................. C08G 63/189 525/285 |
| 6,355,738 B2 | | 3/2002 | Nakamachi |
| 8,124,202 B2 | | 2/2012 | Shi et al. |
| 2005/0267285 A1 | * | 12/2005 | Kulkarni ................ C08G 63/85 528/272 |
| 2006/0182911 A1 | | 8/2006 | Tammaji et al. |
| 2006/0246245 A1 | | 11/2006 | Liu et al. |

FOREIGN PATENT DOCUMENTS

EP      1 650 260 A1    4/2006

OTHER PUBLICATIONS

International Search Report and Written Opinion for PCT/IN2015/050081 dated Nov. 18, 2015.
International Preliminary Report on Patentability for PCT/IN2015/050081 dated Oct. 26, 2016.

* cited by examiner

*Primary Examiner* — Christopher M Rodd
(74) *Attorney, Agent, or Firm* — Martin & Ferraro, LLP

(57) ABSTRACT

The present invention relates to a copolyester having intrinsic viscosity greater than 0.50 dL/gm, comprises: terephthalate polyester composition; and a modified transparent polybutylene naphthalate, wherein the modified polybutylene naphthalate comprises naphthalene dicarboxylic acid, 1,4-butane diol, and isophthalic acid or monoethylene glycol or diethylene glycol or cyclohexane dimethanol or polyethylene naphthalate, nucleating agent, and a modified nanoclay.

10 Claims, No Drawings

PROCESS FOR PREPARATION OF MODIFIED POLYETHYLENE TERPHTHALATE WITH IMPROVED BARRIER, MECHANICAL AND THERMAL PROPERTIES AND PRODUCTS THEREOF

This is a National Phase Application under 35 USC 371 of PCT/IN2015/050081 filed Aug. 5, 2015 (published on Feb. 11, 2016 as WO 2016/020938); which claims priority to Indian Application No. 2216/DEL/2014 filed Aug. 5, 2014; all of which are incorporated by reference herein in their entirety.

FIELD OF THE INVENTION

The present invention relates to modified copolyester with improved performance suitable for use in making packaging containers. More particularly, the invention relates to a process for the preparation of polyethylene terphthalate (PET) copolyester and products made thereof with improved thermal, mechanical, optical, and superior barrier properties.

BACKGROUND OF THE INVENTION

Due to growing demand of reducing the logistic costs in food packaging industry, glass and metal packaging materials have been replaced by plastic materials in recent few years. The advantage of using plastic material are manifold such as reductions in weight and cost, and lower risk of breakage, however the barrier properties of these materials are invariably different from glass and metal packaging materials, that further impacts the shelf stability of the product.

A major concern for many products, and particularly for beverages like beer, is oxidation degradation by oxygen ingress causing taste changes and darkening of the beer, flattening of taste by carbon dioxide loss and damage due to UV light. Over the planned shelf life of a bottle about 1 ppm oxygen maximum ingress into the bottle is acceptable. The egress of carbon dioxide from the beverage through the bottle walls also has to be attenuated to a minimum. For successful conversion from glass to plastic it is very essential to consider oxygen, carbon dioxide, water vapor and flavor scalping as they affect the quality of the products particularly when stored over extended periods of time.

Polyethylene terephthalate polyesters are widely used for fabricating various components such as fibers, sheets, tubes and container owing to their superior mechanical, thermal and gas barrier properties, chemical resistance, flavor-retaining property, transparency, hygienic property, easy of processability, recyclability, and suitability for food contact applications etc.

Polyethylene terphthalate, because of its comparatively better thermal, mechanical, optical and barrier properties, is preferred over other polyesters in packaging applications e.g. use of PET in making beverage container, beer keg, etc. Therefore, Polyethylene terphthalate resins are widely used in the food packaging industry to manufacture bottles and films. PET bottles are used for the carbonated soft drink, fruit juice and mineral water. These products have a shelf life of 8-12 weeks and over this period the gas permeability properties of PET are considered sufficient. However, alcoholic beverages like beer are much more sensitive to oxygen and carbon dioxide diffusion either into or out of the bottle. When this sensitivity to migrating gases is combined with the need for a longer shelf life, it is necessary to improve on the gas permeability properties of PET.

Replacing the glass and metal packaging by polyethylene terephthalate based material is very tedious task that requires maintaining good barrier, optical, thermal and mechanical properties of the bottle so as to improve the shelf life of the food products being packaged.

Various technologies as to making of PET based containers for food packaging exists in the market. Containers can be made from non-PET polyesters as well with lower gas permeability, such as polyethylene naphthalate (PEN). However, there are difficulties in stretch blow molding these bottles and the technology has achieved limited success due to erratic behavior and haze in injection molding with conventional technology. Further difficulties are encountered in bottle blowing of PEN polymer or its alloy/blends with PET. On the whole, PEN containers are also very expensive.

Mono layer polyethylene terephthalate bottles made from PET blended or compounded with naphthalates and isophthalates, such as terpolymer or TIN polymer, have also been attempted with no significant success.

A few patents viz. U.S. Pat. No. 8,124,202, U.S. Pat. No. 6,355,738, and US200602446245 disclose use of PET in combination of other polyesters or additives to make monolayers or multilayers containers with good barrier properties and thermal properties.

US20060182911 patent application discloses blends of barrier resins consisting of a composition of Polyethylene terephthalate and polytrimethylene naphthalate, or polyethylene terephthalate and polybutylene naphthalate exclusively for packaging beverages like beer in a monolayer bottle outperforming the existing other barrier multi-layer bottles is described. The blends of PET/PTN and PET/PBN are produced by using in situ polymerization or melt blending the two polymers or compounding the two polymers to get the PTN and PBN in a PET polymer matrix. The composition of PET blends with PTN and PBN additionally contains other barrier improving additives.

However, the polybutylene naphthalate (PBN) used above is a normal PBN that does not reflect required optical properties to achieve excellent transparency of bottles or containers made from blend thereof as PBN has opaque nature. Therefore when normal PBN is used as such in manufacturing polyester containers, it creates haze in the containers. In order to overcome this problem there is a need to use modified PBN having excellent transparency to avoid haze in the containers.

There is still need to modify polyethylene terphthalate by using modified polybutylene naphthalate to achieve excellent transparency and improved barrier properties of the polyester materials.

The present invention overcomes the foregoing problem by providing a modified polyethylene terphthalate for use in making containers both in monolayer and multilayer construction with improved thermal, mechanical, optical and superior barrier properties.

Thus, modified copolyester becomes usable in packaging application for making containers with enhanced gas barrier properties, longer shelf life and and further recycled in PET stream.

OBJECT OF THE INVENTION

An object of the present invention is to provide a modified copolyester with improved thermal, mechanical, optical and superior barrier properties.

Another object of the present invention is to provide a copolyester for use in making transparent packaging containers with improved gas barrier properties.

Yet, another object of the present invention is to provide modified copolyester for use in making containers with lower Oxygen Transfer Rate (OTR), Water Vapour Transfer Rate (WVTR), and Carbon Dioxide Transfer Rate (CO2 TR) which are suitable for food contact applications.

Yet, another object of the present invention is to provide modified polyethylene terphthalate copolyester having improved thermal, mechanical, optical, and barrier properties.

Further object of the present invention is to provide a process for preparing the modified copolyester with excellent transparency and barrier properties.

Still further object of the present invention is to provide a packaging material, a packaging container or a preform which is capable of withstanding high temperature without undergoing any visual deformation and shrinkage beyond acceptable limits and has improved shelf life due to its superior barrier properties.

Further object of the present invention is to provide a process for preparing clear to transparent containers comprising modified polyethylene terphthalate polyester and naphthalate polyester with superior barriers properties.

Further object of the present invention is to prepare containers using the modified copolyester of polyethylene terphthalate through Injection Blow Moulding (IBM), Injection Stretch Blow Moulding (ISBM), and Extrusion Blow Moulding (EBM) and the like methods by avoiding thermal haze occurring due to faster crystallization of normal polybutylene naphthalate.

Other objects and advantages of the present invention will be more apparent from the following description which is not intended to limit the scope of the present disclosure.

SUMMARY OF THE INVENTION

The present invention provides a process for preparing a copolyester composition having improved barrier properties the process comprising: contacting a terephthalate copolyester composition of modified transparent polybutylene naphthalate and other essential additives in presence required reaction conditions and suitable polymerization catalysts.

In one embodiment of the present invention, a copolyester having intrinsic viscosity greater than 0.50 dL/gm, for manufacture of containers that can withstand an ambient temperature of about 70° C., comprises: at least one terephthalate polyester composition; and a modified transparent polybutylene naphthalate, wherein the modified polybutylene naphthalate comprises naphthalene dicarboxylic acid, 1,4-butane diol, and isophthalic acid or monoethylene glycol or diethylene glycol or cyclohexane dimethanol or polyethylene naphthalate, at least one nucleating agent, and a modified nanoclay.

In one aspect of the invention, the terephthalate polyester composition comprises of polyethylene terphthalate (PET), and polyethylene naphthalate (PEN) or polyethylene isosorbide terephthalate (PEIT), or combination thereof.

In another aspect of the invention, the polyethylene naphthalate (PEN) in the terephthalate polymer composition is used in an amount up to 10 wt. % based on total weight of the copolyester and polyethylene isosorbide terephthalate (PEIT) is used in an amount up to 10 wt. % based on total weight of the polyester.

In another preferred aspect of the invention the claimed copolyester is modified polyethylene terphthalate polyester having improved thermal, mechanical, optical, barrier properties, and excellent transparency.

In another aspect the copolyester of the invention is used in packaging applications such as preparing transparent containers for beer packaging, and other beverage applications.

Yet another aspect of the invention is that the packaging application of the coplyester may be a packaging material, a packaging container, or a preform capable of withstanding high temperature up to 75° C. without undergoing any visual deformation and shrinkage beyond acceptable limit which is 2.5%, preferably 1.5%.

In another aspect, the packaging material of the claimed polyester may be transparent containers for applications in beer and other beverage and food packaging.

In one preferred embodiment of the present invention, the copolyester used in the process of the present invention comprises of polyethylene terphthalate (PET), and polyethylene naphthalate (PEN) or polyethylene isosorbide terephthalate (PEIT), or combination thereof; and copolymer of the polybutylene naphthalate comprising naphthalene dicarboxylic acid, 1,4-butane diol, and isophthalic acid or monoethylene glycol or diethylene glycol or cyclohexane dimethanol or polyethylene naphthalate polyester.

A process of preparing a copolyester having intrinsic viscosity greater than 0.50 dL/gm, for manufacture of containers that can withstand an ambient temperature of about 75° C., comprises steps of reacting terephthalic acid or ester thereof with monoethylene glycol and other diols, monomers, a nucleating agent, and a modified nanoclay at temperature about 150° C. to 270° C. in presence of catalysts under atmospheric pressure to obtain pre-polymers; mixing polyethylene naphthalate and modified transparent polybutylene naphthalate in the melt to obtain uniform reaction mixture consisting of said prepolymer; polymerizing said reaction mixture at temperature at about 270° C. and 295° C. under pressure below 1 mili bar to obtain melt polymer of the required degree of polymerization; extruding the melt polymer to obtain amorphous granules of intrinsic viscosity >0.40 dL/gm followed by crystallization thereof under atmospheric pressure and temperature at about 120° C. and 140° C.; and solid state polymerizing the crystalized polymer to upgrade the intrinsic viscosity to above 0.50 dL/gm.

In one embodiment of the present invention, the terephthalate copolyester used in the process of the present invention comprises dicarboxylic acid, diol, at least one additional comonomer, polymer catalysts, and at least one agent.

In an embodiment, the copolyester used in the process can alternatively be obtained by mechanical or chemical recycling of recycled polyethylene terephthalate (RPET) flakes.

In one aspect, the modified polyethylene terphthalate is obtained by incorporating at least one comonomers and/or polymer viz. modified transparent polybutylene naphthalate (PBN), before or during or after the esterification or polycondensation or polymerization. In one another aspect, the modified polybutylene naphthalate copolymer can be inducted in extruder while blending the copolyester and modified polybutylene naphthalate copolymer.

The induction of the comonomers and/or copolyester as per the process of the present invention results in the desired barrier polymer with enhanced barrier properties and excellent transparency.

In an embodiment of the present invention, the copolyester composition can be prepared by reacting polyethylene terphthalate with polyethylene naphthalate or polyethylene isosorbide naphthalate, and modified polybutylene naphthalate.

In an embodiment of the present invention, the modified polyethylene terphthalate can be prepared by reacting polyethylene terphthalate with isosorbide and modified polybutylene naphthalate.

In an embodiment of the present invention, the modified polyethylene terphthalate copolyester can be prepared by esterification and subsequent polymerization of terephthalic acid, isophthalic acid, naphthalene dicarboxylic acid or 2,6-dimethyl carboxylate, monoethylene glycol, butane diol and at least one agent in presence of polymer catalysts. The esterification is carried out at temperature from about 220 to 705° C. and the polymerization is carried out at temperature range from about 270 to 290° C.

In an embodiment, the polyester used in the process can be manufactured from method comprising recycling recycled polyethylene terephthalate flakes by its glycolysis and subsequent polymerization to yield PET; and further adding isophthalic acid, polyethylene naphthalate and polybutylene naphthalate with or without its modification.

In another embodiment, the modified polybutylene naphthalate can alternately be blended with the copolyester after completion of the polycondensation reaction to obtain the modified copolyester and products thereof.

In one aspect of the invention, the present invention relates to products comprising the modified copolyester, modified or unmodified polybutylene naphthalate and at least one essential additive.

The modified copolyester obtained in accordance with the process of the present invention can be used in packaging applications such as preparing transparent containers, beer keg or products thereof. The material or container obtained from the copolyester of the present disclosure has comparatively improved thermal, mechanical and optical and barrier properties. More specifically the products have lower oxygen transfer rate (oxygen ingress), Carbon dioxide transfer rate, water vapor transfer rate and inert gas transfer rate while achieving better transparency and good thermal and mechanical properties. In one aspect of the present invention, the copolyester can be used in making dish washable containers, aerosol containers, and other containers capable of undergoing process pasteurization process for packaging food items as well as no food products.

The present invention relates to modified copolyester used for making transparent and gas barrier containers, monolayer or multilayers, by using at least one moulding process selected from the group consisting of injection blow moulding (IBM), injection stretch blow moulding (ISBM), extrusion blow moulding (EBM), heat set blowing process, and other blow moulding techniques.

The present invention relates to modified copolyester used for making the transparent beer keg with better barrier, thermal, mechanical and optical properties by using at least one moulding process selected from the group consisting of IBM, ISBM, EBM, and EMB including normal blow moulding and heat set blowing process.

The modified copolyester used for making containers can be polyethylene isosorbide terphthalate butylene naphthalate (PEITBN), polyethylene terphthalate butylene naphthalate (PETBN).

Other objects, features and advantages of the product, its composition, method and uses described herein will become apparent from the following description. It should be understood, however, that the detailed description and the specific example, while indicating specific embodiments, are given by way of illustration only, since various changes and modifications within the spirit and scope of the disclosure will become apparent to those skilled in the art from the detailed description.

DETAILED DESCRIPTION OF THE INVENTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, $C_m$-$C_n$, such as $C_1$-$C_{12}$, $C_1$-$C_8$, or $C_1$-$C_6$ when used before a group refers to that group containing m to n carbon atoms As used herein, "alkyl" groups include straight chain and branched alkyl groups having from 1 to about 20 carbon atoms (i.e., $C_1$-$C_{20}$ alkyl), and typically from 1 to 12 carbon atoms (i.e., $C_1$-$C_{12}$ alkyl) or, in some embodiments, from 1 to 8 carbon atoms (i.e., $C_1$-$C_8$ alkyl). As employed herein, "alkyl groups" include cycloalkyl groups as defined below. Alkyl groups may be substituted or unsubstituted. This term includes, by way of example, linear and branched hydrocarbyl groups such as methyl ($CH_3$—), ethyl ($CH_3CH_2$—), n-propyl ($CH_3CH_2CH_2$—), isopropyl (($CH_3)_2CH$—), n-butyl ($CH_3CH_2CH_2CH_2$—), isobutyl (($CH_3)_2CHCH_2$—), sec-butyl (($CH_3)(CH_3CH_2)CH$—), t-butyl (($CH_3)_3C$—), n-pentyl ($CH_3CH_2CH_2CH_2CH_2$—), and neopentyl (($CH_3)_3CCH_2$—). Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

The term "including" is used to mean "including but not limited to." "Including" and "including but not limited to" are used interchangeably.

The term "degree of polymerization" (DP) is an art recognized term referring to the number of monomer units in a polymer The term "prepolymer" refers to a molecule of intermediate relative molecular mass, the structure of which essentially comprises a small plurality of units derived, actually or conceptually, from molecules of lower relative molecular mass.

The term "transparent PBN" refers to a modified Polybutylene naphthalate that can achieve excellent transparency and improved barrier properties.

The term "diethylene content" refers to residue of diethylene glycol (DEG) present in the final product and is determined by the method described in the example section of the present disclosure.

The term "carboxylic end group content" refers to —COOH end group present at the end of polymer chains and is determined by the method described in the example section of the present disclosure.

The polyester obtained in accordance with the method of the present invention is herein also referred as "modified polyethylene terephthalate" or "Modified Copolyester" or "modified PET" or "modified polymer".

The term "intrinsic viscosity" (I.V.) as used herein is a measure of the molecular mass of the polymer and is measured by dilute solution using a Ubbelohde viscometer. All intrinsic viscosities are measured in a 60:40 mixture of phenol and s-tetrachloroethane with 0.5% concentration.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, 5 to 40 mole % should be interpreted to include not only the explicitly recited limits of 5 to 40 mole %, but also to include sub-ranges, such as 10 mole % to 30 mole %, 7 mole % to 25 mole %, and so forth, as well as individual amounts, including fractional amounts, within the specified ranges, such as 15.5 mole %, 29.1 mole %, and 12.9 mole %, for example.

In one aspect, the present inventors have found that the incorporation of additional copolymers and/or comonomers into polyethylene terphthalate (PET) results in a modified copolyester with new set of properties useful for making packaging containers. The modified copolyester so obtained shows improved, thermal, mechanical and barrier properties.

In one aspect is provided a process of preparing a copolyester having intrinsic viscosity greater than 0.50 dL/gm, for manufacture of containers that can withstand an ambient temperature of about 75° C., comprising: reacting terephthalic acid or ester thereof with monoethylene glycol and other diols, monomers, a nucleating agent, and a modified nanoclay at temperature about 150° C. to 270° C. in presence of catalysts under atmospheric pressure to obtain pre-polymers; mixing polyethylene naphthalate and modified transparent polybutylene naphthalate in the melt to obtain uniform reaction mixture consisting of said prepolymer; polymerizing said reaction mixture at temperature at about 270° C. and 295° C. under pressure below 1 mili bar to obtain melt polymer of the required degree of polymerization; extruding the melt polymer to obtain amorphous granules of intrinsic viscosity >0.40 dL/gm followed by crystallization thereof under atmospheric pressure and temperature at about 120° C. and 140° C.; and solid state polymerizing the crystalized polymer to upgrade the intrinsic viscosity to above 0.50 dL/gm.

The prepolymers of the process are obtained esterification reaction is carried out at temperature about 220° C. and 270° C., and ester interchange reaction is carried out at temperature about 150° C. to 200° C.

In an aspect of the invention, the modified polybutylene naphthalate is used in the process in an amount of up to 30 wt. % based on total weight of the copolyester.

In some embodiments modified transparent polybutylene naphthalate comprises naphthalene dicarboxylic acid, 1,4 butane diol, and isophthalic acid or monoethylene glycol or diethylene glycol or cyclohexane dimethanol or polyethylene naphthalate, and at least one nucleating agent and modified clay.

In some embodiments, the nanoclay used in the process is at least one selected from the group consisting of calcium silicate, nano silica powder, talc, microtalc, aclyn, kaolinite, montmorillonite, synthetic mica, calcium sulfide, boron nitride, barium sulfate, aluminum oxide, neodymium oxide and a metal salt of phenyl phosphonate.

In one aspect, a process of preparing the modified copolyester is provided wherein the crystalised modified copolyester exhibits an intrinsic viscosity greater than about 0.75 dL/g. In some embodiments, the I.V. is greater than about 0.5 dL/g. In some embodiments, the I.V. is greater than about 0.3 dL/g. In some embodiments, the I.V. is greater than about 0.25 dL/g. In some embodiments, the I.V. is greater than about 0.2 dL/g. In some embodiments, the I.V. is greater than about 0.15 dL/g. In some embodiments, the I.V. is greater than about 0.10 dL/g. The crystalized modified copolyester made from the process of the present invention may exhibit an intrinsic viscosity from about 0.1 dL/g to about 1 dL/g. This may include an I.V. from about 0.2 dL/g to about 1 dL/g, from about 0.3 dL/g to about 0.75 dL/g, or from about 0.4 dL/g to about 0.5 dL/g, and ranges between and including any two of these values. In some embodiments, the crystallized modified copolyester exhibits an intrinsic viscosity greater than 0.40 dL/g. In one aspect, a process of preparing a crystallized modified co-polyester is provided wherein the crystallized crystallized modified co-polyester comprises polyethylene naphthalate content of greater than or equal to about 1 wt %. This may include a polyethylene naphthalate content of greater than or equal to about 5 wt %, greater than or equal to about 10 wt %, greater than or equal to about 15 wt %, greater than or equal to about 20 wt %, greater than or equal to about 25 wt %, or greater than or equal to about 50 wt %. The crystallized modified PET copolyester may comprise a polyethylene naphthalate content from about 0.1 wt % to about 80 wt %, from about 5 wt % to about 50 wt %, from about 10 wt % to about 45 wt %, from about 13 wt % to about 40 wt %, from about 15 wt % to about 40 wt %, or from about 20 wt % to about 30 wt %, and ranges between and including any two of these values. In some preferred embodiments, the crystallized modified PET copolyester may comprise a polyethylene naphthalate content of up to 10 wt %.

In one aspect, a process of preparing a crystallized modified co-polyester is provided wherein the crystallized modified co-polyester comprises polyethylene isosorbide terephthalate (PEIT) content of greater than or equal to about 1 wt %. This may include a polyethylene isosorbide terephthalate (PEIT) content of greater than or equal to about 5 wt %, greater than or equal to about 10 wt %, greater than or equal to about 15 wt %, greater than or equal to about 20 wt %, greater than or equal to about 25 wt %, or greater than or equal to about 50 wt %. The crystallized modified PET copolyester may comprise a polyethylene isosorbide terephthalate (PEIT) content from about 0.1 wt % to about 80 wt %, from about 5 wt % to about 50 wt %, from about 10 wt % to about 45 wt %, from about 13 wt % to about 40 wt %, from about 15 wt % to about 40 wt %, or from about 20 wt % to about 30 wt %, and ranges between and including any two of these values. In some preferred embodiments, the crystallized modified PET copolyester may comprise a polyethylene isosorbide terephthalate (PEIT) content of up to 10 wt %.

In one aspect, a process of preparing a crystallized modified co-polyester is provided wherein the crystallized modified co-polyester comprises modified transparent polybutylene naphthalate content of greater than or equal to about 1 wt %. This may include a modified transparent polybutylene naphthalate content of greater than or equal to about 5 wt %, greater than or equal to about 10 wt %, greater than or equal to about 15 wt %, greater than or equal to about 20 wt %, greater than or equal to about 25 wt %, or greater than or equal to about 50 wt %. The crystallized modified PET copolyester may comprise a modified transparent polybutylene naphthalate content from about 0.1 wt % to about 80 wt %, from about 5 wt % to about 50 wt %, from about 10 wt % to about 45 wt %, from about 13 wt % to about 40 wt %, from about 15 wt % to about 40 wt %, or from about 20 wt % to about 30 wt %, and ranges between and including any two of these values. In some preferred embodiments, the crystallized modified PET copolyester may comprise modified transparent polybutylene naphthalate content of up to 30 wt %.

The process further includes subjecting the crystallized copoylester to solid state polymerization (SSP). The SSP leads to an increase in the molecular weight and/or intrinsic viscosity of the co-polyester product and reduction in oligomer contents.

In another aspect of the invention, the solid state polymerization reaction is carried out in batch SSP unit under pressure below 2 mili bar, or in continuation SSP in presence of nitrogen gas.

In another aspect, provided is a process of preparing a sulfonated co-polyester which involves used of modified transparent polybutylene terephthalate. The modified transparent polybutylene terephthalate polyester helps to obtain transparent PET copolyester with improved barrier properties.

The prepolymers can be prepared from two or more dicarboxylic acid residues. The dicarboxylic acid residue may be derived from a aliphatic dicarboxylic acid, an aliphatic dicarboxylate, a cycloaliphatic dicarboxylic acid, a cycloaliphatic dicarboxylate, an aromatic dicarboxylic acid, or an aromatic dicarboxylate or a combination of any two or more thereof. Examples of aromatic dicarboxylic diacids include terephthalic acid, isophthalic acid, 2,6-naphthalene dicarboxylic acid, and ester derivatives thereof. Examples of aliphatic diacids include adipic acid, glutaric acid, succinic acid, azelaic acid, or ester derivatives thereof.

The dicarboxylic acid residue may be from terephthalic acid, dimethyl terephthalate, dimethyl isophthalate, dimethyl-2,6-naphthalate, 2,7-naphthalenedicarboxylic acid, dimethyl-2,7-naphthalate, 3,4'-diphenyl ether dicarboxylic acid, dimethyl-3,4'-diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl-4,4'-methylenebis(benzoate), dimethyl oxalate, malonic acid, dimethyl malonate, dimethyl succinate, methylsuccinic acid, 2-methylglutaric acid, 3-methylglutaric acid, dimethyl adipate, 3-methyladipic acid, dimethyl azelate, sebacic acid, 1,11-undecanedicarboxylic acid, 1,10-decanedicarboxylic acid, undecanedioic acid, 1,12-dodecanedicarboxylic acid, hexadecanedioic acid, docosanedioic acid, tetracosanedioic acid, dimer acid, dimethyl-1,4-cyclohexanedicarboxylate, dimethyl-1,3-cyclohexanedicarboxylate, 1,1-cyclohexanediacetic acid, metal salts of 5-sulfo-dimethylisophthalate, maleic anhydride, or a combination of any two or more thereof.

Some non-limiting examples of dicarboxylic acid residue are isophthalic acid, 2,6-naphthalene dicarboxylic acid, oxalic acid, maleic acid, succinic acid, glutaric acid, dimethyl glutarate, adipic acid, 2,2,5,5-tetramethylhexanedioic acid, pimelic acid, suberic acid, azelaic acid, 1,4-cyclohexanedicarboxylic acid, 1,3-cyclohexanedicarboxylic acid, 1,1-cyclohexanediacetic acid, fumaric acid, maleic acid, hexahydrophthalic acid, and phthalic acid.

The prepolymer can be prepared using suitable methods known in the art. For example, the dicarboxylic acid or ester thereof can be reacted with an alkylene diol at a suitable temperature and pressure for a sufficient amount of time to obtain the pre-polymer. Suitable esterification conditions can be employed for the preparation of the prepolymer. For example, the reaction can be conducted at a temperature of about 300° C. or below, about 200° C. or below, about 100° C. or below, at about 80° C. or below, at about 50° C. or below, at about 45° C. or below, at about 40° C. or below, at about 35° C. or below, at about 30° C. or below, at about 25° C. or below or at about 20° C. or below, and ranges between and including any two of these values. The reaction can be conducted at a pressure of about 1 bar to about 30 bars, about 2 bars to about 20 bars, about 3 bars to about 10 bars, about 4 bars to about 5 bars, and ranges between and including any two of these values. In some embodiments, the reaction pressure is up to about 20 bars, up to about 10 bars, up to about 5 bars, up to about 3 bars, up to about 2 bars, up to about 1 bar, and ranges between and including any two of these values. The reaction can be conducted for a period of about 1 min to about 60 min, about 1 h to about 5 h, about 5 h to about 8 h, about 8 h to about 15 h, about 15 h to about 25 h, about 25 h to about 40 h, and ranges between and including any two of these values. In some embodiments, the reaction of dicarboxylic acid or ester thereof with an alkylene diol is conducted at a temperature of about 240° C. to about 260° C. and at a pressure of up to about 4 bars for about 2 h to about 3 h.

In some embodiment, the prepolymer used in the process may be prepared by processes known in the art, such as for example, DMT or PTA route using PTA/DMT and MEG. It can also be produced using clean PCR (Post-consumer recycled) PET flakes in place of PTA/DMT and MEG. In some embodiments, batch or continuous polymerization methods can be used.

The pre-polymer may be added to the polyethylene naphthalate (PEN) or polyethylene isosorbide terephthalate (PEIT), and modified transparent polybutylene naphthalate composition at various amounts. In some embodiments, the prepolymer is added in an amount ranging from about 0.01% to about 99% by weight of the total weight of the sulfonated co-polyester. This includes embodiments in which the amount ranges from about 10% to about 99%, from about 20% to about 95%, from about 30% to about 92%, from about 40% to about 90%, from about 50% to about 80% and from about 60% to about 75% of the total weight of the co-polyester composition, and ranges between any two of these values or less than any one of these values. In some embodiments, the pre-polymer may constitute from about 0.01 wt %, about 10 wt %, about 20 wt %, about 30 wt %, about 40 wt %, about 50 wt %, about 60 wt %, about 70 wt %, about 80 wt %, about 90.0 wt %, about 95.0 wt %, about 99.0 wt %, and ranges between any two of these values or less than any one of these values. However, other amounts are possible. The particular amount depends upon the desired properties of the co-polyester composition. In some embodiments, the polyethylene naphthalate (PEN) or polyethylene isosorbide terephthalate (PEIT) includes up to about 10 wt % of the copolyester. In some embodiments, the modified transparent polybutylene naphthalate includes up to about 30 wt % of the copolyester.

The diols may include suitable diols known in the art. For example, the alkylene diol may include glycols that have 2 to 20 carbon atoms. The diols may be un-substituted or substituted; straight chain, branched, cyclic aliphatic diol, aliphatic-aromatic diol, aromatic diol, or a combination of any two or more thereof. The diol can also be poly (alkylene ether) glycols with molecular weights between about 250 to about 4,000. Examples of dihydric alcohols include ethylene glycol, 1,3-propanediol, 1,4-butanediol, 1,6-hexanediol, and poly (ethylene ether) glycols. The branched diols include $C_4$-$C_{16}$ aliphatic branched diols. The branched diol may have 4-12 carbon atoms. In some embodiments, the branched diol may have 4-10 carbon atoms. In other embodiments, the branched diol may have 4-8 carbon atoms.

In some embodiments, the alkylene diols include $C_4$-$C_5$ branched aliphatic diols. Examples of branched diols include, but are not limited to, 2-methyl-1,3-propanediol, 2,2-dimethyl-1,3-propanediol, 2-butyl-2-ethyl-1,3-propanediol, trimethylpentanediol, and the like. The diol may be a cycloaliphatic diol having between 6-20 carbon atoms, with the proviso that if a cyclohexane diol is used, it is included with at least one additional cyclic or branched diol. For example, isosorbide or a mixture of (cis, trans) 1,3-cyclohexanedimethanol and (cis, trans) 1,4 cyclohexanedimethanol may be used. Examples of aromatic diol may include xylene glycol, and hydroquinone. In one embodiment the diol may be 1,3-propanediol, 1,4-butanediol, 1,6-hexanediol, 1,8-octanediol, 1,10-decanediol, 1,12-dodecanediol, 1,14-tetradecanediol, 1,16-hexadecanediol, dimer diol, 1,4-cyclohexanedimethanol, di(ethylene glycol), tri(ethylene glycol), poly(ethylene ether) glycols, poly(butylene ether) glycols, 2-methyl-1,3-propanediol, 2,2-dimethyl-1,3-propanediol, 2-butyl-2-ethyl-1,3-propanediol, trimethylpentanediol, isosorbide or a mixture of (cis, trans) 1,3-cyclohexanedimethanol and (cis, trans) 1,4 cyclohexanedimethanol, xylene glycol, or hydroquinone.

The alkylene diol can be a straight chain or a branched diol having 3 to 12 carbon atoms per molecule. Examples of suitable diols include, but are not limited to, ethylene glycol, propanediol, butanediol, cyclohexanedimethanol, hexane diol, octanediol, decanediol, dodecanediol, or a combination of any two or more thereof. In some embodiments, the alkylene diol is ethylene glycol.

Examples of suitable diols include, but are not limited to, ethylene glycol, propanediol, butanediol, cyclohexanedimethanol, hexane diol, octanediol, decanediol, dodecanediol, or a combination of any two or more thereof.

The modified copolyester may be produced by suitable polymerization techniques known in the art. For example, the inform polymer mixture may be polymerized using suitable polycondensation techniques known in the art. In some embodiments, the modified copolyester is produced by any of the conventional melt or solid state polycondensation techniques. The melt polycondensation method can be carried out in either batch, semi-continuous or continuous mode. The method is best carried out in a reactor equipped with a distillation column and a stirrer or other means for agitation. The distillation column separates the volatile product of reaction (water and/or alkanol) from volatile reactants (e.g., ethylene glycol). Use of a distillation column allows for operation at a lower molar ratio of ethylene glycol to terephthalic acid, which serves to suppress the formation of DEG. Melt polycondensation can be carried out in conventional method like PTA, DMT and PCR PET glycolysis. When terephthalic acid is used in the polymerization method, the volatile reaction product will be water; when an ester such as dimethyl terephthalate is used, the volatile reaction product will be the corresponding alkanol (such as methanol), together with smaller amounts of water. Continuous polymerization method may be used to prepare polyesters.

In one aspect, the method further includes crystallizing the amorphous granules of the modified copolyester. Suitable crystallization techniques known in the art may be used to produce the crystallized modified co-polyester. The crystallization reaction can be conducted by heating the amorphous copolyester at a suitable temperature for a suitable period of time. For example, the crystallization can be conducted at a temperature of about 10° C. to about 300° C., about 30° C. to about 200° C., about 50° C. to about 250° C. about 80° C. to about 200° C. and about 100° C. to about 150° C., and ranges between and including any two of these values. In some embodiments, the amorphous copolyester is crystallized at a temperature in the range of about 120° C. to about 140° C. to produce a crystallized modified co-polyester.

The reaction of producing the prepolymer may further include addition of one or more additives. In some embodiments, the additive is a nucleating agent, branching agent, chain extender, antioxidant, plasticizers, stabilizing agent, a coloring agent, or other additives. Additives may also be added before or during or after the polymerization reaction to impart requisite property to the resulting co-polyester. Such additives include but are not limited to dyes; pigments; flame retardant additives such as decabromodiphenyl ether and triarylphosphates, such as triphenylphosphate; reinforcing agents such as glass fibers; thermal stabilizers; ultraviolet light stabilizers methoding aids, impact modifiers, flow enhancing additives, ionomers, liquid crystal polymers, fluoropolymers, olefins including cyclic olefins, polyamides and ethylene vinyl acetate copolymers.

The additives described herein, for example, the plasticizer, anti-oxidizing agent, stabilizing agent, and end-capped oligomer, if present, can be incorporated for example, at a concentration of about 0.001 wt %, about 0.01 wt %, about 0.02 wt %, about 0.05 wt %, about 0.1 wt %, about 0.5 wt %, about 1.0 wt %, about 2 wt %, about 5 wt %, about 10.0 wt %, about 15.0 wt %, about 20.0 wt %, about 30.0 wt %, and ranges between any two of these values or less than any one of these values. Other additives, such as for example, nucleating agent and the branching agent, if present, can be incorporated for example, at a concentration from about 0.1 ppm to about 10,000 ppm, about 2 ppm to about 5000 ppm, about 5 ppm to about 7500 ppm, about 10 ppm to about 2000 ppm, about 20 ppm to about 1000 ppm, or about 50 ppm to about 500 ppm, and ranges between any two of these values or less than any one of these values.

Examples of additives include, but are not limited to, a liquid plasticizer, a nucleating agent, a branching agent, an anti-oxidizing agent, a stabilizing agent, and an end-capped oligomer. In some embodiments, the additive may be a branching agent in an amount of 10 ppm to 2000 ppm, a nucleating agent in an amount of 10 ppm to 2000 ppm, a liquid plasticizer in an amount of 0.5 to 2 wt %, and at least one anti-oxidizing agent in an amount ranging from 0.1 to 5%. Other agents useful for the purpose of the present disclosure include at least one end-capped oligomer in an amount from 1 to 20 wt %.

The branching agent may be, but is not limited to, 1,2,4-benzenetricarboxylic acid (trimellitic acid); trimethyl-1,2,4-benzenetricarboxylate; 1,2,4-benzenetricarboxylic anhydride (trimellitic anhydride); 1,3,5-benzenetricarboxylic acid; 1,2,4,5-benzenetetracarboxylic acid (pyromellitic acid); 1,2,4,5-benzenetetracarboxylic dianhydride (pyromellitic anhydride); 3,3',4,4'-benzophenonetetracarboxylic dianhydride; 1,4,5,8-naphthalenetetracarboxylic dianhydride; citric acid; tetrahydrofuran-2,3,4,5-tetracarboxylic acid; 1,3,5-cyclohexanetricarboxylic acid; pentaerythritol, 2-(hydroxymethyl)-1,3-propanediol; 2,2-bis(hydroxymethyl) propionic acid; sorbitol; glycerol; or a combination of any two or more thereof. Particularly, branching agents may include pentaerythritol, trimellitic acid, trimellitic anhydride, pyromellitic acid, pyromellitic anhydride and sorbitol.

It is believed that the nucleating agent improves the crystallinity and increases heat deformation temperature of the polyester product. The nucleating agent can be organic or inorganic. Examples of inorganic nucleating agent include, but are not limited to, calcium silicate, nano silica powder, talc, microtalc, aclyn, kaolinite, montmorillonite, synthetic mica, calcium sulfide, boron nitride, barium sulfate, aluminum oxide, neodymium oxide, or a metal salt of phenyl phosphonate. The inorganic nucleating agent can be modified by an organic material to improve its dispersibility in the polyester product of the present disclosure.

Examples of organic nucleating agent include, but are not limited to, carboxylic acid metal salts such as sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanoate, calcium octacosanoate, sodium stearate, potassium stearate, lithium stearate, calcium stearate, magnesium stearate, barium stearate, sodium montanate, calcium montanate, sodium toluoylate, sodium salicylate, potassium salicylate, zinc salicylate, aluminum dibenzoate, potassium dibenzoate, lithium dibenzoate, sodium β-naphthalate and sodium cyclohexane carboxylate; organic sulfonates such as sodium p-toluene sulfonate and sodium sulfoisophthalate; carboxylic acid amides such as stearic acid amide, ethylene bis-lauric acid amide, palmitic acid amide, hydroxystearic acid amide, erucic acid amide and tris(t-butylamide) trimesate; phosphoric compound metal salts such as benzylidene sorbitol and derivatives thereof, sodium-2,2'-methylenebis(4,6-di-t-butylphenyl)phosphate, and 2,2-methylbis(4,6-di-t-butylphenyl)sodium, and the like, or a combination of any two or more thereof.

Examples of liquid plasticizers include, but are not limited to, N-isopropyl benzene sulfonamide, N-tert-butyl benzene sulfonamide, N-pentyl benzene sulfonamide, N-hexyl benzene sulfonamide, N-n-octyl benzene sulfonamide, N-methyl-N-butyl benzene sulfonamide, N-methyl-N-ethyl benzene sulfonamide, N-methyl-N-propyl benzene sulfonamide, N-ethyl-N-propyl benzene sulfonamide, N-ethyl-p-ethylbenzenesulfonamide, N-ethyl-p-(t-butyl)benzene sulfonamide, N-butyl-p-butyl benzene sulfonamide, N-butyl toluene sulfonamide, N-t-octyl toluene sulfonamide, N-ethyl-N-2-ethylhexyl toluene sulfonamide, N-ethyl-N-t-octyl toluene sulfonamide and tri-octyltrimellitate, and the like, or a combination of any two or more thereof.

Examples of anti-oxidizing agent include, but are not limited to, Irganox® 1010, Irganox® 1076, Irgafos® 126 and Irgafos® 168. Similarly, copper nitrate (up to 150 ppm) along with potassium iodide, potassium bromides (up to 1000 ppm), or any other Light & UV Stabilizers which can be added to enhance weatherability of the polymers.

Examples of stabilizing agent include, but are not limited to, ortho-phosphoric acid, trimethylphosphate (TMP), triphynylphosphate (TPP), or triethylphosphono acetate (TEPA). In some embodiments, an ortho-phosphoric acid is used as stabilizing agent.

Examples of end-capped oligomers include, but are not limited to, oligomers of polyethylene terephthalate, polybutylene terephthalate, polytrimethylene terephthalate, polytrimethylenenaphthalate and polybutylenenaphthalate, and the like, or a combination of any two or more thereof.

The processes s and products described herein may include other suitable additives known in the art such as, but not limited to, pigments, flame retardant additives such as decabromodiphenyl ether and triarylphosphates, such as triphenylphosphate, reinforcing agents such as glass fibers, thermal stabilizers, ultraviolet light stabilizers methoding aids, impact modifiers, flow enhancing additives, ionomers, liquid crystal polymers, fluoropolymers, olefins including cyclic olefins, polyamides, and ethylene vinyl acetate copolymers.

In one embodiment, the processes also include subjecting the crystallized modified copolyester to solid state polymerization conditions. Such action increases the molecular weight and the intrinsic viscosity of the co-polymer. The solid state polymerization is conducted under a vacuum or in the presence of a stream of an inert gas. Suitable inert gases include, but are not limited to, nitrogen, carbon dioxide, helium, argon, neon, krypton, xenon, and the like. Suitable solid state polymerization temperatures can range from a temperature at or above the polymerization reaction temperature up to a temperature below their melting point. For example, the solid state polymerization reaction can be conducted at a temperature of about 400° C. or below, about 300° C. or below, about 200° C. or below, about 100° C. or below, at about 80° C. or below, at about 50° C. or below, at about 45° C. or below, at about 40° C. or below, at about 35° C. or below, at about 30° C. or below, at about 25° C. or below or at about 20° C. or below, and ranges between and including any two of these values. In some embodiments, the solid state polymerization is conducted at a temperature of about 50° C. to about 400° C., about 80° C. to about 350° C., about 100° C. to about 300° C., about 150° C. to about 250° C., about 180° C. to about 200° C., and ranges between and including any two of these values. The copolyester can be solid state polymerized for a time sufficient to increase its molecular weight or IV to the desired value. For example, the solid state polymerization reaction can be conducted for a period of about 1 min to about 60 min, about 1 h to about 5 h, about 5 h to about 8 h, about 8 h to about 15 h, about 15 h to about 25 h, about 25 h to about 40 h, and ranges between and including any two of these values.

In one embodiment, the crystallized modified copolyester is subjected to solid state polymerization by placing the pelletized or pulverized polymer into a tumble drier of an inert gas, such as nitrogen, or under a vacuum of 1 torr, at an elevated temperature, above 150° C. but below the melting temperature, for a period of about 4 to about 16 hours. In some embodiments, the solid state polymerization is carried out at a temperature of about 180° C. to about 200° C. which results in an increase in inherent viscosity to more than 0.5 dl/g.

The prepolymer can be prepared by treating equal molar proportions of dicarboxylic acid residues (100 mole %) and diol residues (100 mole %) to form repeating units (100 mole %).

In one aspect, provided are a modified PETcopolyester and products thereof, wherein the copolyester includes: at least one terephthalate polyester composition; and a modified transparent polybutylene naphthalate, wherein the modified polybutylene naphthalate comprises naphthalene dicarboxylic acid, 1,4-butane diol, and isophthalic acid or monoethylene glycol or diethylene glycol or cyclohexane dimethanol or polyethylene naphthalate, at least one nucleating agent, and a modified nanoclay.

In one aspect, provided are modified PET copolyesters which can be used in beverage or food packaging applications. The modified PET copolyester includes at least one terephthalate polyester composition; and a modified transparent polybutylene naphthalate. The products made by use of polyester terephthalate composition and modified polybutylene naphthalate (transparent PBN) have comparatively longer shelf life/good barrier properties, while achieving the superior light transmittance and enhanced thermal and mechanical properties of the products.

A copolyester having intrinsic viscosity greater than 0.50 dL/gm, for manufacture of containers that can withstand an ambient temperature of about 70° C., comprises: at least one terephthalate polyester composition; and a modified transparent polybutylene naphthalate, wherein the modified polybutylene naphthalate comprises naphthalene dicarboxylic acid, 1,4-butane diol, and isophthalic acid or monoethylene glycol or diethylene glycol or cyclohexane dimethanol or polyethylene naphthalate, at least one nucleating agent, and a modified nanoclay.

The copolyester used in the process are at least one selected from the group consisting of polybutylene naphthalate (also known as modified PBN "MPBN), polyethylene naphthalate (PEN), polyethylene isosorbide terephthalate (PEIT) and the comonomers used in the process are at least one selected from the group of isophthalaic acid, isosorbide, diethylene glycol (DEG), monoethylene glycol (MEG), cyclohexane dimethanol (CHDM) and the like.

The present invention provides a process to prepare the copolyester comprising: recycling RPET flakes by its glycolysis to yield PET; and further adding isophthalic acid, polyethylene naphthalate and polybutylene naphthalate with or without its modification.

The copolyester used in the process of the present disclosure comprises dicarboxylic acid, diol at least one additional comonomer, polymer catalysts and at least one agent. The co-monomer preferably is isophthalic acid.

In an embodiment, the copolyester used in the process can alternatively be obtained by mechanical or chemical recycling of RPET flakes or by employing ester interchange between DMT, MEG and DMIP and subsequent polymerization.

The present invention provides a modified copolyester that can be used in packaging applications. More specifically, the present invention provides the modified copolyester that can be used in packaging to produce clear container. A packaging container, a packaging material or a preform prepared from the polyethylene terphthalate polyester provides improved barrier properties, thermal, mechanical and optical properties. The modified copolyester of the present disclosure comprises a copolyester, a naphthalate polyester, polybutylene naphthalate with or without its modification and at least one agent.

In an embodiment of the present invention, the modified polyethylene terphthalate (PET) copolyester can be prepared by reacting polyethylene terphthalate (PET) with polyethylene naphthalate (PEN), PBN and modified polybutylene naphthalate (transparent PBN).

In an embodiment of the present invention, the modified polyethylene terphthalate (PET) copolyester can be prepared by reacting polyethylene terphthalate (PET) with polyethylene naphthalate (PEN), isosorbide, polybutylene naphthalate, and modified polybutylene naphthalate (transparent PBN).

In an embodiment of the present invention, the modified polyethylene terphthalate (PET) copolyester can be prepared by reacting polyethylene terphthalate (PET) with isosorbide, polybutylene naphthalate, and modified polybutylene naphthalate (transparent PBN).

In an embodiment of the present invention, the modified polyethylene terphthalate (PET) can be prepared by esterification and subsequent polymerization of terephthalic acid, isophthalic acid, naphthalene dicarboxylic acid or 2,6-dimethyl carboxylate, monoethylene glycol, butane diol, and at least crystallization suppressing agent agent in presence of polymer catalysts. The Esterification is carried out at temperature from 150 to 265° C. and the polymerization is carried out at temperature range from 250 to 290° C.

In an embodiment, the copolyester is prepared by addition of polyethylene naphthalate (PEN) and polybutylene naphthalate (PBN) with or without its modification during the process of manufacturing of polyethylene terphthalate.

In one embodiment, the modified polybutylene naphthalate can alternately be blended with the copolyester after the polycondensation reaction to obtain the modified copolyester and products thereof.

In one aspect of the disclosure, the present invention relates to products comprising the modified copolyester, modified or unmodified polybutylene naphthalate and at least one essential additive.

The copolyester used in the process of the present invention is obtained from the polymerization reaction of at least one aromatic dicarboxylic acid or ester thereof and alkylene glycol and further addition of at least one comonomer selected from the group of isophthalaic acid, isosorbide, polyethylene naphthalate at various stages of polymerization reaction. For example the the comonomer can be added before or after the esterification or polycondensation reaction.

In an embodiment, the polyester used in the process of the present invention can be obtained by recycling of RPET flakes. The recycling of RPET is done either by mechanical or chemical methods. The mechanical recyclingcomprising the steps of washing RPET flakes; melting the flakes; and extruding the molten PET to amorphous state. The amorphous PET is further solid state polymerized to achieve the crystalline PET.

Alternatively, hydrolysis or methanolysis or glycolysis of RPET flakes yields monomers of polyester used in the process of the present disclosure e.g. terephthalic acid or dimethyl terphthalate or BHET or DGT and monoethylene glycol or water.

The modified polybutylene naphthalate (MPBN) is obtained from the esterification of naphthalene dicarboxylic acid or 2,6-dimethyl naphthalene dicarboxylate and 1,4-butane diol; and subsequent polymerization of the prepolymer obtained from the esterification in presence of at least one comonomer selected from the group consisting of alkylene diol, cyclic diol, aliphatic or aromatic acid or polyester. The comonomer used in the process controls the required rate of crystallization of polybutylene naphthalate, thus the comonomer acts as a crystallization suppressing or retarding agent or quenching agent during thermal crystallization while cooling from the melt phase and results in clear polybutylene naphthalate.

The alkylene diol used as co-monomer to prepare clear PBN is selected from the group consisting of monoethylene glycol, diethylene glycol, propanediol, butanediol, hexane diol and the like.

The cyclic diol used as comonomer to prepare clear PBN is selected from the group consisting of cyclohexanedimethanol, and the like.

The carboxylic acid used as comonomer to prepare clear PBN is selected from the group consisting of oxalic acid, malonic acid, succinic acid, glutaric acid, adipic acid, pimelic acid, suberic caid, azelaic acid, sebacic acid, brassidic caid, thapsic acid, maleic acid, fumaric acid, glutaconic acid, alpha-hydromuconic acid, beta-hydromuconic acid, alpha-butyl, alpha-ethylglutaric acid, alpha-beta-diethyl succinic acid, isophthalic acid, terephthalic acid, hemimellitic acid and 1,4-cyclohexanedicarboxylic acids.

The polyester used as comonomer to prepare clear PBN is selected from the group consisting of polyethylene terphthalate, polyethylene terphthalate glycol modified (PET-G), polyethylene naphthalene.

Additives may also be added before or during or after the polymerization reaction to impart requisite property to the resulting polyester. Such additives include but are not limited to pigments; thermal stabilizers; ultraviolet light stabilizers processing aids and impact modifiers.

Examples of agents useful for the purpose of the invention are described herein before.

The disclosure of the present invention relates to products made of the modified modified copolyester, the product comprising:modified polybutylene naphthalate in an amount of 5 to 30 wt % and polyethylene terphthalate or polyethylene terphthalate naphthalate in a an amount of 70 to 95 wt %; at least one agent selected from the group consisting of liquid plasticizer; at least one nucleating agent; at least one branching agent; at least one anti-oxidizing agent; at least one stabilizing agent; at least one additive and optionally, at least one end capped oligomer.

In an embodiment, the products of the present invention can directly be manufactured by moulding the melt comprising polyethylene terphthalate (PET), polyethylene naphthalate (PEN) and polybutylene naphthalate (PBN) with or without its modification.

In an embodiment, polyethylene terphthalate (PET), polyethylene naphthalate (PEN) and polybutylene naphthalate (PBN) are directly melt blended while moulding.

In an embodiment, polyethylene terphthalate (PET), polyethylene naphthalate (PEN) and polybutylene naphthalate (PBN) are first melt blended and then extruded to collect amorphous chips, the amorphous chips are further solid state crystallized to crystalline modified polyethylene terphthalate.

The modified copolyester obtained in accordance with the process of the present disclosure can be used in packaging applications such as preparing transparent containers, beer keg or products thereof.

The material or container obtained from the modified copolyester of the present disclosure has comparatively improved thermal, mechanical and optical and barrier properties. More specifically the products have lower oxygen transfer rate (oxygen ingress), Carbon dioxide transfer rate, water vapor transfer rate and inert gas transfer rate while achieving better transparency and good thermal and mechanical properties.

The modified copolyester is extruded and granulated using underwater cutter to obtain chips which are transparent with better barrier properties. The chips are dried and then injection molded to preform by processing at temperatureabove its melting point. The preforms are further processed in to container by IBM (Injection Blow Moulding); ISBM (Injection Stretch Blow Moulding) including other methods. These containers are transparent and can be monolayer or multilayer.

The present invention also provides a packaging product comprising a modified copolyester product of the present disclosure. The packaging product can be a preform or a packaging material or a packaging container.

The modified copolyester produced in accordance with the present disclosure imparts improved barrier properties and transparency (haze value below 5 NTU) due to presence of polybutylene naphthalate. The modified copolyester prepared in accordance with the present disclosure can be used to manufacture monolayer or multilayer containers by normal ISBM, IBM, IM, EBM processes, with or without heat set blow molding process for applications in various beverages, sport drinks, sauces, jams etc.

The modified copolyester of the present invention is used for making transparent packaging containers and products thereof with improved shelf life. The modified copolyester of the present disclosure can be used for making the transparent beer keg.

The modified copolyester of the present invention is further described in light of the following examples which are set forth for illustration purpose only and not to be construed for limiting the scope of the disclosure.

Quality Parameters and Analytical Methods:

The modified copolyester of the present disclosure exhibits one or more properties of intrinsic viscosity greater than 0.5 at 25° C., color L* ranges from 50 to 62%; color b* ranges from −3.0 to 10; diethylene content of less than 1.4%; glass transition temperature in the range of 74 to 90° C. and others such properties. These properties are used as quality parameters of the final finished product. The quality parameters of the modified copolyester in accordance to the present disclosure, has been measured by various well known analytical methods. Such analytical methods which have been used for the measurement of the physical parameters of the polyester of the present disclosure are: Billmeyer equation used for measuring the intrinsic viscosity; Hunter-LabColorFlex Model No 45/0, serial No. CX 0969 for knowing the value of color indicators such as L*, a* and b*; Haze Gard Plus (BYK Gardner) is used to know haze value as % haze per mm of sample thickness; Gas Chromatography (GC) to determine the DEG content of the polymer; DSC analysis to monitor thermal properties of all polymers samples at heating and cooling rates of 10° C. per minute. DSC is used to know glass transition temperatures (Tg), crystallization exotherm peak temperatures and heats of crystallization (ΔH), as well as peak endotherm temperatures and heats of fusion for all materials.

EXAMPLES

The following non-limiting examples are intended to illustrate, but not to limit, the scope of the present invention.

Example 1: Preparation of Modified Polyethylene Terphthalate by Incorporation of the Modified Polybutylene Naphthalate at the End of Esterification in Presence of Isosorbide 57.96 kg of pure terephthalic acid and 25.74 kg of monoethylene glycol are taken in an esterification reactor, in 1:1.16 molar ratio. To this, sodium acetate 50 ppm (4 g) is added after charging PTA slurry and 2.00 kg of isosorbide is added to the reactor after charging sodium acetate and 2.80 kg of isophthalaic acid is further added after charging the isosorbide. Polymerization catalyst antimony trioxide 200 ppm as Sb (19.13 g), germanium oxide 20 ppm as Ge (2.31 g), colorants cobalt acetate 30 ppm as Co (10.14 g), blue toner 0.3 ppm (0.16 g) are added to the above mixture. The esterification reaction is carried out at 150-265° C. temperature for three to four hours. At the end of esterification reaction 14.37 gm (50 ppm) ortho phosphoric acid is further mixed in the reactor. The esterified pre-polymer is then transferred to the polycondensation reactor.

The polymerization is conducted at a temperature of 250-290° C. under 760 to 1 torr for two to three hours. At the end of esterification, 8.00 kg of modified polybutylene naphthalate (10%) is added to the polycondensation reactor and the mixture is hold up for 20 minutes. After the required torque is reached, the molten amorphous polymer is extruded under nitrogen pressure and collected as pellets. The resulting amorphous polymer with I.V. ~0.6 dL/g is further solid state polymerized to achieve the crystallized polymer. The solidified polymer so obtained is made into a preform by injection molding and analyzed for their characteristics. Subsequently the quality parameters were measured for amorphous and SSP crystalline copolyester, and the corresponding results are produced herein the Table 1.

Example 2: Preparation of Modified Polyethylene Terphthalate by Incorporation of the Modified Polybutylene Naphthalate at the End of Esterification in Presence of PEN Chips 59.5 kg of pure terephthalic acid and 25.8 kg of monoethylene glycol are taken in an esterification reactor, in 1:1.16 molar ratio. To this, sodium acetate 75 ppm (6 g) is added after charging PTA slurry, nanoclay (1%), and 2.00 kg of isophthalaic acid is added after charging sodium acetate. Polymerization catalyst antimony trioxide 200 ppm as Sb (19.13 g), germanium oxide 20 ppm as Ge (2.31 g), colorants cobalt acetate 35 ppm as Co (11.82 g), blue toner 0.3 ppm (0.024 g) and 3.20 kg (4%) of polyethylene naphthalate chips are as such added to the above mixture. The esterification reaction is carried out at 150-265° C. temperature for three to four hours. At the end of esterification reaction 14.37 gm (10%) ortho-phosphoric acid is further mixed in the vessel. The esterified pre-polymer is then transferred to the polycondensation reactor.

At the end of esterification, 8.00 kg of modified polybutylene naphthalate is added to the polycondensation reactor. The polymerization is conducted at a temperature of 250-290° C. under 760 to 1 torr for two to three hours. After the required torque is reached, the molten amorphous polymer is extruded under nitrogen pressure and collected as pellets. The resulting amorphous polymer with I.V. ~0.6 dL/g is further solid state polymerized to achieve the crystallized polymer. The solidified polymer so obtained is made into a preform by injection molding and analyzed for their characteristics.

Subsequently the quality parameters were measured for amorphous and SSP crystalline copolyester, and the corresponding results are produced herein the Table 1.

Example 3: Preparation of Modified Polyethylene Terphthalate by Incorporation of the Modified Polybutylene Naphthalate at the End of Polycondensation in Presence of Isosorbide In this example, all procedural steps and the quantity of the chemical used for the process remained same as were used in Example 1 explained above. The modified polybutylene naphthalate (MPBN) however were added to the reactor at the end of the polycondensation reaction. Subsequently the quality parameters were measured for amorphous and SSP crystalline copolyester, and the corresponding results are produced herein the Table 1.

Example 4: Preparation of Modified Polyethylene Terphthalate by Incorporation of the Modified Polybutylene Naphthalate at the End of Polycondensation in Presence of PEN Chips In this example, all procedural steps and the quantity of the chemical used for the process remained same as were used in Example 2 explained above. The modified polybutylene naphthalate (MPBN) however were added to the reactor at the end of the polycondensation reaction. Subsequently the quality parameters were measured for amorphous and SSP crystalline copolyester, and the corresponding results are produced herein the Table 1.

TABLE 1

| | | \multicolumn{2}{c}{Quality Parameters of the Modified Copolyester} | | |
|---|---|---|---|---|---|
| | | MPBN Added at the End of EI | | MPBN Added at the End of PC | |
| Chemicals used | Unit | Example 1 | Example 2 | Example 3 | Example 4 |
| Isosorbide | % | 2.5 | Nil | 2.5 | nil |
| PEN chips | % | Nil | 4.0 | nil | 4.0 |
| IPA | % | 3.5 | 2.5 | 3.5 | 2.5 |
| PBN | % | 10.0 | 10.0 | 10.0 | 10.0 |
| MEG | Mole | — | — | — | — |
| TiPT | ppm | — | — | — | — |
| SodiumAcetate | ppm | 50 | 75 | 50 | 75 |
| Irgonox | ppm | 4000 | Nil | 4000 | nil |
| Sb | ppm | 200 | 200 | 200 | 200 |
| Co | ppm | 30 | 30 | 30 | 30 |
| Ge | ppm | 20 | 20 | 20 | 20 |
| P | ppm | 50 | 50 | 50 | 50 |
| BT | ppm | 0.3 | 0.3 | 0.3 | 0.3 |
| \multicolumn{6}{c}{Amorphous sample Analysis} | | | | | |
| IV | dl/g | 0.515 | 0.505 | 0.545 | 0.555 |
| —COOH | meq/kg | 42 | 47 | 23 | 26 |
| L* | % | 51.2 | 55.2 | 57.9 | 58.3 |
| a* | — | −0.9 | −1.3 | −0.4 | −0.6 |
| b* | — | 2.3 | 1.8 | −1.2 | −2.8 |
| DEG | % | 1.6 | 1.54 | 1.43 | 1.46 |
| IPA | % | 3.42 | 2.53 | 3.48 | 2.51 |
| Tg1 | ° C. | 80.8 | 80.3 | 79.1 | 79.3 |
| Tch1 | ° C. | 168.8 | 169.6 | 159.8 | 163.6 |
| Tm1 | ° C. | 235.7 | 235.7 | 232.7 | 231.7 |
| Tg2 | ° C. | 80.1 | 81.2 | 80.6 | 81.6 |
| Tch2 | ° C. | 173.2 | 174.2 | 161.2 | 164.2 |
| Tm2 | ° C. | 234.0 | 235.2 | 231.0 | 230.0 |
| \multicolumn{6}{c}{SSP Sample Analysis} | | | | | |
| Blend ratio | % | — | — | — | — |
| IV | dl/g | 0.776 | 0.781 | 0.786 | 0.783 |
| COOH NO. | meq/kg | 33 | 36 | 12 | 16 |
| L* | % | 75.1 | 78.2 | 78.6 | 80.1 |
| a* | | −2.6 | −0.9 | −0.7 | −0.8 |
| b* | | 2.8 | 1.2 | −0.8 | −4.3 |
| DEG | % | 1.61 | 1.52 | 1.42 | 1.49 |
| IPA | % | 3.43 | 5.5 | 3.49 | 2.49 |
| Tm 1 | ° C. | 227.6 | 241.1 | 237.6 | 229.1 |
| Delta Hf1 | j/g | 36.8 | 32.50 | 43.5 | 42.50 |
| % of crystallinity | % | 32.0 | 28.3 | 37.8 | 37.0 |
| Tg 2 | ° C. | 81.3 | 81.8 | 81.1 | 81.9 |
| Tch 2 | ° C. | 178.2 | 182.2 | 163.2 | 164.2 |
| Tm 2 | ° C. | 232.0 | 233.9 | 230.8 | 230.0 |
| Tensile Strength | Kgf/cm2 | 605.1 | 615.2 | 598.2 | 596.87 |
| Elongation | % | 320 | 332 | 328 | 340.87 |
| Tensile Modulus | Gpa | 1.82 | 1.85 | 1.96 | 1.94 |
| Flexural Strength | Kgf/cm2 | 840.3 | 862 | 844.2 | 851.79 |
| Impact (Notch) | J/M | 55.8 | 56.7 | 58.2 | 59 |

TABLE 1-continued

Quality Parameters of the Modified Copolyester

|  |  | MPBN Added at the End of EI | | MPBN Added at the End of PC | |
| --- | --- | --- | --- | --- | --- |
| Chemicals used | Unit | Example 1 | Example 2 | Example 3 | Example 4 |
| Impact (Un-notch) | % | 100% NB | 100% NB | 100% NB | 100% NB |
| MFI at 280 | gms/10 min | 19.6 | 18.6 | 20.1 | 19.3 |

Example 5: Incorporation of Modified Polybutylene Naphthalate (MPBN) into COPET by Direct Blending in Extruder The copolyester of polyethylene naphthalate (PET) were separately prepared in accordance to the Example 1 and 2. Thereafter, the copolyester so obtained from the Example 1 and 2 were directly blended with modified polybutylene naphthalate (MPBN) in extruder separately and two samples were prepared separately. The extruded polymer so obtained were further quenched to get amorphous chips and further solid state polymerized to get the crystalline chips. The samples were further analyzed for their characteristics provided in Table 2 below.

TABLE 2

Quality Parameters of the Modified Copolyester Obtained by Direct Blending of MPBN
Example 5: Direct Blended of MPBN in Extruder

| Chemical Used | Unit | Copolyester 1 | Copolyester 2 | Modified PBN or Clear PBN |
| --- | --- | --- | --- | --- |
| Isosorbide | % | 2.5 | nil | — |
| PEN chips | % | nil | 4.0 | — |
| IPA | % | 3.5 | 2.5 | — |
| PBN | % | — | — | — |
| MEG | Mole | — | — | 0.8 |
| TiPT | Ppm | — | — | 25 + 25 |
| NaAc | Ppm | 50 | 75 | — |
| Antioxidant | Ppm | 4000 | nil | — |
| Sb | Ppm | 200 | 200 | — |
| Co | Ppm | 30 | 30 | — |
| Ge | Ppm | 20 | 20 | — |
| P | Ppm | 50 | 50 | — |
| BT | Ppm | 0.3 | 0.3 | 0.5 |
| Amorphous sample Analysis | | | | |
| IV | dl/g | 0.563 | 0.555 | 0.503 |
| —COOH | meq/kg | 19 | 17 | 26 |
| L* | % | 56 | 55.9 | 60.8 |
| a* | — | −0.9 | −0.15 | −0.61 |
| b* | — | 0.5 | −1.88 | 5.74 |
| DEG | % | 1.8 | 1.7 | nil |
| IPA | % | 3.45 | 2.54 | nil |
| Tg1 | ° C. | 78.8 | 80.6 | 82.7 |
| Tch1 | ° C. | 152.8 | 156.9 | 101.7 |
| Tm1 | ° C. | 240.7 | 242.8 | 201.5 |
| Tg2 | ° C. | 80.7 | 80.3 | 84.1 |
| Tch2 | ° C. | 154.2 | 159.2 | 101.1 |
| Tm2 | ° C. | 240.0 | 241.3 | 198.1 |
| SSP sample Analysis | | | | |
| Blend ratio | % | 90 | 90 | 10 |
| IV | dl/g | 0.828 | 0.838 | 0.562 |
| COOH NO. | meq/kg | 9 | 7 | 17 |
| L* | % | 77.8 | 79.29 | 77.9 |
| a* | | −1.7 | −0.72 | −1.4 |
| b* | | −1.8 | −3.6 | −0.5 |
| DEG | % | 1.73 | 1.7 | Nil |
| IPA | % | 3.39 | 2.5 | BDO: 22.2% |
| Tm 1 | ° C. | 237.6 | 241.1 | 201.7 |
| Delta Hf1 | j/g | 44.6 | 38.83 | 28.0 |
| % of crystallinity | % | 38.8 | 33.8 | — |
| Tg 2 | ° C. | 81.0 | 81.3 | 83.9 |
| Tch 2 | ° C. | 169.3 | 167.5 | 101.6 |
| Tm 2 | ° C. | 238.9 | 240.5 | 197.9 |
| Tensile Strength | Kgf/cm2 | 586.77 | 599.19 | 542.67 |
| Elongation | % | 110.33 | 330.25 | 20.88 |
| Tensile Modulus | Gpa | 1.72 | 1.97 | 1.69 |
| Flexural Strength | Kgf/cm2 | 828.33 | 890.52 | 813.16 |
| Impact (Notch) | J/M | 53.75 | 58.56 | 21.25 |
| Impact (Un-notch) | % | 100% NB | 100% NB | 57% NB |
| MFI at 280 | gms/10 min | 18.3 | 20.2 | 79.5 |

The above examples are one of such methods by which modified polyethyleneterphthalate can be prepared. The objectives of the invention can be achieved by use of at least one selected from the group consisting clear PBN, polyethylene naphthalate, isophthalaic acid, isosorbide and the like.

Different samples of the modified polybutylene copolyester were synthesized by using the similar procedure disposed above in Examples 1 to 5 by using formulation mentioned in the table 1. Raw material quantities mentioned in the said table is in weight percentage with respect to the polymer. The melting, crystallization and the glass transition temperatures of the polyester were measures using DSC and other testing equipments.

Example 6: Manufacture of Thin Walled Containers by IM

The resin from Example 1 to 2 was used on IM machine to manufacture containers. Prior to that the chips were dried at 160° C. for 7 hours. The mold was cooled with chilled water at f 6° C. The melt flow was satisfactory. The containers of 350μ wall thickness were manufactured. The containers were of good color & transparency and could be filled at 82° C. temperature.

Example 7: Manufacture of 20 Liter Container by 2 Stage ISBM

The copolyester from Example 1 to 2 was used to manufacture 20 liter water container. The chips were dried at 170° C. temperature for 6 hours. On a single caring injection molding machine the perform were made. The extruder temperatures were in the range 275-285° C. The preforms were subsequently blow at 30 bar pressure after heating at 120° C. on single caring blowing machines. The 20 liter containers manufactured could be washed at 72° C.

The embodiments herein and the various features and advantageous details thereof are explained with reference to the non-limiting embodiments in the description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles and the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

While considerable emphasis has been placed herein on the particular features of this disclosure, it will be appreciated that various modifications can be made, and that many changes can be made in the preferred embodiments without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

We claim:

1. A copolyester having intrinsic viscosity greater than 0.50 dL/gm, the copolyester comprising:
    terephthalate polyester composition; and
    a modified transparent polybutylene naphthalate having an intrinsic viscosity >0.50 dL/g; and haze value <7 NTU comprising naphthalene dicarboxylic acid, 1,4-butane diol, and isophthalic acid or monoethylene glycol or diethylene glycol or cyclohexane dimethanol or polyethylene naphthalate, and at least one or more additives,
    wherein the copolyester is used for the manufacture of containers that can withstand an ambient temperature of about 75° C.

2. The copolyester as claimed in claim 1 wherein said terephthalate polyester composition comprises of polyethylene terphthalate (PET), and polyethylene naphthalate (PEN) or polyethylene isosorbide terephthalate (PEIT), or combination thereof.

3. The copolyester as claimed in claim 2 wherein said polyethylene naphthalate (PEN) is in an amount up to 10 wt % based on total weight of the copolyester and polyethylene isosorbide terephthalate (PEIT) is in an amount up to 10 wt % based on total weight of the polyester.

4. A process of preparing a copolyester, which is used for the manufacture of containers that can withstand ambient temperature of about 75° C., having intrinsic viscosity greater than 0.50 dL/gm, comprising:
    reacting terephthalic acid or ester thereof with monoethylene glycol and other diols, monomers, a nucleating agent, and a modified nanoclay at temperature about 150° C. to 270° C. in presence of catalysts under atmospheric pressure to obtain pre-polymers;
    mixing the pre-polymers from the previous step and polyethylene naphthalate and modified transparent polybutylene naphthalate in the melt to obtain a uniform reaction mixture; wherein the modified transparent polybutylene naphthalate has an intrinsic viscosity of >0.5 dL/g and haze <7 NTU and comprises naphthalene dicarboxylic acid, 1,4-butane diol, and isophthalic acid or monoethylene glycol or diethylene glycol or cyclohexane dimethanol or polyethylene naphthalate;
    polymerizing said reaction mixture at temperature at about 270° C. and 295° C. under pressure below 1 mili bar to obtain melt polymer of the required degree of polymerization;
    extruding the melt polymer to obtain amorphous granules of intrinsic viscosity >0.40 dL/gm followed by crystallization thereof under atmospheric pressure and temperature at about 120° C. and 140° C.; and
    solid state polymerizing the crystalized polymer to upgrade the intrinsic viscosity to above 0.50 dL/gm.

5. The process as claimed in claim 4, wherein the pre-polymers are obtained in esterification reaction carried out at temperature about 220° C. and 270° C., or ester interchange reaction carried out at temperature about 150° C. to 200° C.

6. The process as claimed in claim 4, wherein the modified polybutylene naphthalate is in an amount of up to 30 wt % based on total weight of the copolyester.

7. The process as claimed in claim 4, wherein the nanoclay is selected from the group consisting of calcium silicate, nano silica powder, talc, microtalc, aclyn, kaolinite, montmorillonite, synthetic mica, calcium sulfide, boron nitride, barium sulfate, aluminum oxide, neodymium oxide and a metal salt of phenyl phosphonate.

8. The process as claimed in claim 4, wherein the modified transparent polybutylene naphthalate at least one nucleating agent and modified clay.

9. The process as claimed in claim 4, wherein solid state polymerization (SSP) reaction is carried out in batch SSP unit under pressure below 2 mili bar, or in continuation SSP in presence of nitrogen gas.

10. The copolyester as claimed in claim 1, wherein the copolyester is used in injection blow moulding, injection moulding, injection stretched blow moulding, dish washable containers, aerosol containers, extrusion blow moulding to manufacture containers for applications in beer packaging, and other beverages, and containers capable of undergoing process pasteurization process for packaging food items as well as no food products, or a preform capable of withstanding high temperature up to 75° C. without undergoing any visual deformation and shrinkage beyond acceptable limit which is 2.5% or 1.5%.

* * * * *